United States Patent
Okuma et al.

(10) Patent No.: US 9,238,399 B2
(45) Date of Patent: Jan. 19, 2016

(54) SLIDE STRUCTURE FOR POWER SLIDE DOOR AND CABLE ASSEMBLY METHOD FOR SLIDE DOOR CENTER

(71) Applicants: AISIN TECHNICAL CENTER OF AMERICA, INC., Plymouth, MI (US); AISIN SEIKI KABUSHIKI KAISHA, Kariya (JP)

(72) Inventors: Emiko Okuma, Novi, MI (US); Tomohide Kato, Toyoake (JP)

(73) Assignees: AISIN TECHNICAL CENTER OR AMERICA, INC., Plymouth, MI (US); AISIN SEIKI KABUSHIKI KAISHA, Kariya-Shi (JP)

( * ) Notice: Subject to any disclaimer, the term of this patent is extended or adjusted under 35 U.S.C. 154(b) by 36 days.

(21) Appl. No.: 14/250,804

(22) Filed: Apr. 11, 2014

(65) Prior Publication Data

US 2015/0291013 A1   Oct. 15, 2015

(51) Int. Cl.
*B60J 5/06*      (2006.01)
*E05D 15/06*   (2006.01)

(52) U.S. Cl.
CPC ............... *B60J 5/06* (2013.01); *E05D 15/0621* (2013.01)

(58) Field of Classification Search
CPC .................. E05Y 2201/654; E05Y 2900/531; E05F 15/646; B60J 5/06
USPC .............................................. 49/360; 296/155
See application file for complete search history.

(56) References Cited

U.S. PATENT DOCUMENTS

| | | | | |
|---|---|---|---|---|
| 4,157,846 | A * | 6/1979 | Whitcroft | 296/155 |
| 4,559,740 | A * | 12/1985 | Tuchiya et al. | 49/216 |
| 5,046,283 | A | 9/1991 | Compeau et al. | |
| 5,138,795 | A * | 8/1992 | Compeau et al. | 49/138 |
| 5,319,881 | A * | 6/1994 | Kuhlman | 49/360 |
| 5,323,570 | A * | 6/1994 | Kuhlman et al. | 49/360 |
| 5,737,876 | A * | 4/1998 | Dowling | 49/360 |
| 5,906,071 | A * | 5/1999 | Buchanan, Jr. | 49/360 |
| 6,390,535 | B1 * | 5/2002 | Chapman | 296/155 |
| 6,481,783 | B1 * | 11/2002 | Rogers et al. | 296/155 |
| 6,561,569 | B1 * | 5/2003 | Risdon et al. | 296/155 |
| 7,077,773 | B2 * | 7/2006 | Chapman et al. | 474/112 |
| 7,325,361 | B2 * | 2/2008 | Rogers et al. | 49/360 |
| 7,669,367 | B2 * | 3/2010 | Shimura et al. | 49/213 |
| 7,690,711 | B2 * | 4/2010 | McGowan et al. | 296/57.1 |
| 2002/0043818 | A1 * | 4/2002 | Fukumoto et al. | 296/155 |
| 2004/0216383 | A1 * | 11/2004 | Rogers et al. | 49/360 |
| 2004/0221510 | A1 * | 11/2004 | Fukumoto et al. | 49/360 |
| 2006/0137252 | A1 * | 6/2006 | Kriese et al. | 49/360 |
| 2010/0018125 | A1 * | 1/2010 | Oh | 49/449 |
| 2010/0199567 | A1 * | 8/2010 | Ishida et al. | 49/360 |
| 2011/0126466 | A1 * | 6/2011 | Adachi et al. | 49/262 |
| 2015/0033503 | A1 * | 2/2015 | Yamada et al. | 16/91 |

FOREIGN PATENT DOCUMENTS

WO   WO 2013129206 A1 *   9/2013

* cited by examiner

*Primary Examiner* — Katherine Mitchell
*Assistant Examiner* — Justin Rephann
(74) *Attorney, Agent, or Firm* — Oblon, McClelland, Maier & Neustadt, L.L.P.

(57) ABSTRACT

A slide structure that slides a door of a vehicle, including a roller hinge attached to the door; a guide roller that rolls within a rail of the door; a cable end that transmits a sliding force to the roller hinge to slide the door; and a guide roller pin that attaches the guide roller and the cable end to the roller hinge.

8 Claims, 9 Drawing Sheets

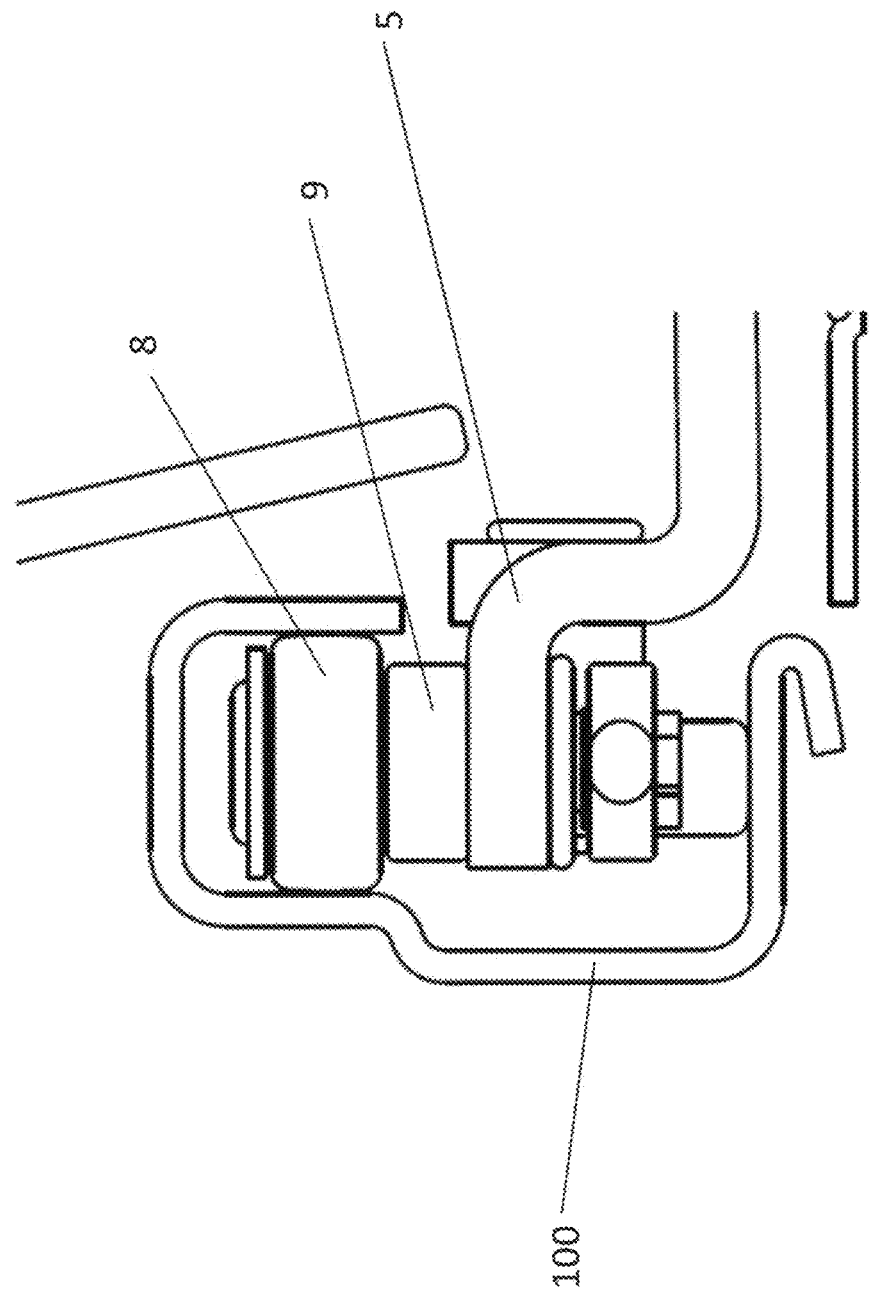

US 9,238,399 B2

SLIDE STRUCTURE FOR POWER SLIDE DOOR AND CABLE ASSEMBLY METHOD FOR SLIDE DOOR CENTER

BACKGROUND OF THE INVENTION

Land vehicles such as vans may be provided with side doors that slide along a length of the vehicle. These slide doors have advantages of allowing a large opening for ingress/egress and requiring less lateral operational space compared to a conventional vehicle door that pivots outward on a hinge. These slide doors may be manually operated, where a user slides the door after unlatching; or the slide doors may be powered by an electric motor or the like to open and/or close the slide door. An example of such a conventional sliding mechanism is shown by U.S. Pat. No. 5,046,283.

FIELD OF THE INVENTION

Exemplary aspects of the present invention relate slide structure for a power slide door mechanism including a power slide cable and a roller hinge.

SUMMARY OF THE INVENTION

The present application relates to a power slide door for an exterior door of a vehicle. The slide structure eliminates the conventional cable bracket while ensuring proper hooking to the cable to the roller hinge. This allows the slide structure of the present application to be installed in a smaller space and be used with a non-power sliding door.

Here, the slide structure that slides a door of a vehicle, including a roller hinge attached to the door; a guide roller that rolls within a rail of the door; a cable end that transmits a sliding force to the roller hinge to slide the door; and a guide roller pin that attaches the guide roller and the cable end to the roller hinge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 illustrates a side view of a slide structure in accordance with the present disclosure.

DETAILED DESCRIPTION OF THE PREFERRED EMBODIMENTS

Figure 1:
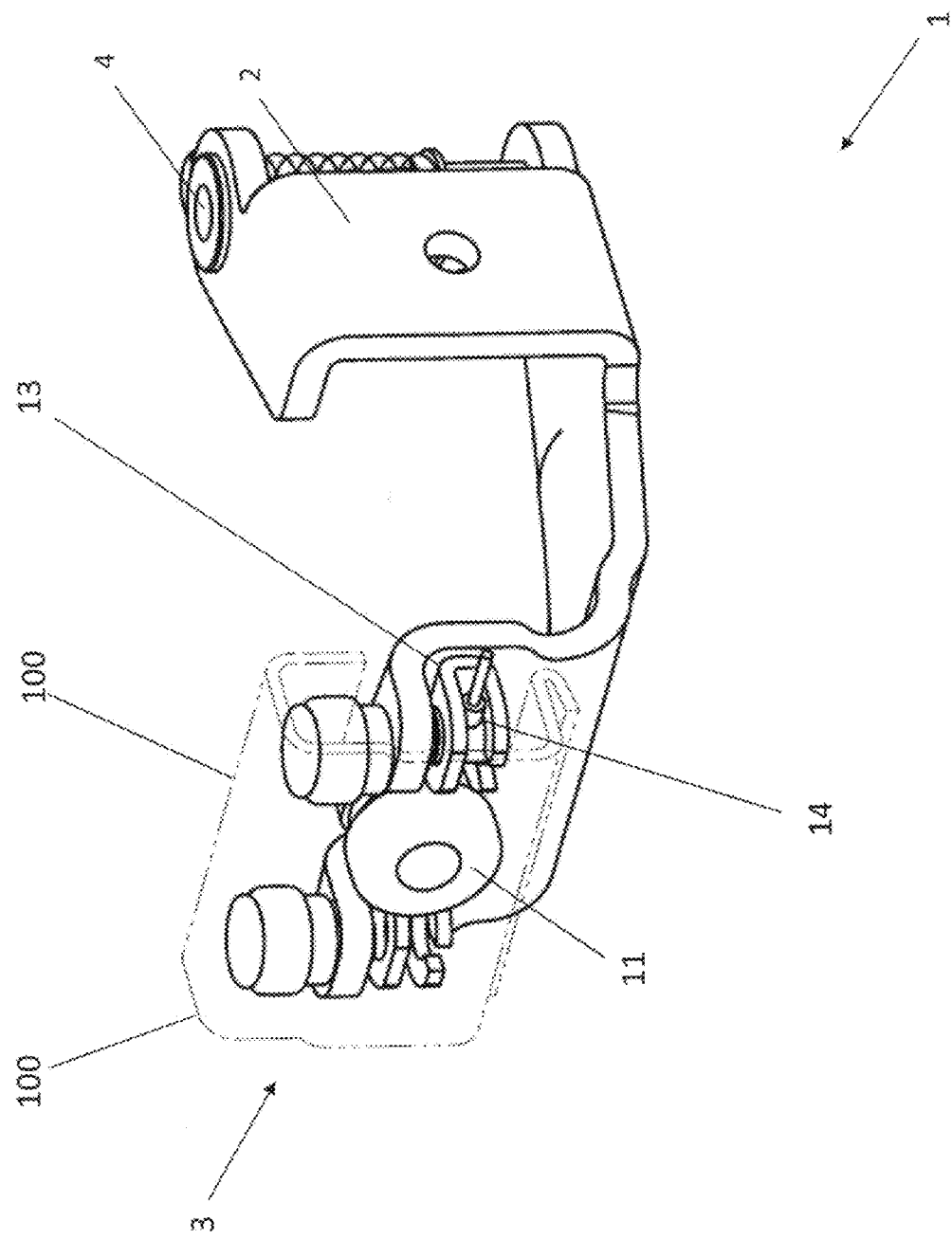
FIG. 1 illustrates an isometric view of a slide structure in accordance with the present disclosure.

Referring now to the drawings, wherein like reference numerals designate identical or corresponding parts throughout the several views. Further, as used herein, the words "a," "an" and the like generally carry a meaning of "one or more," unless stated otherwise.

FIGS. 1-13 depict various aspects of a slide structure for a vehicle door. Here a vehicle refers to a land vehicle exemplified by a passenger van or minivan. However, the present disclosure is also applicable to any similar type vehicle, such as but not limited to, a sport utility vehicle, a commercial vehicle, or the like.

Figure 2:
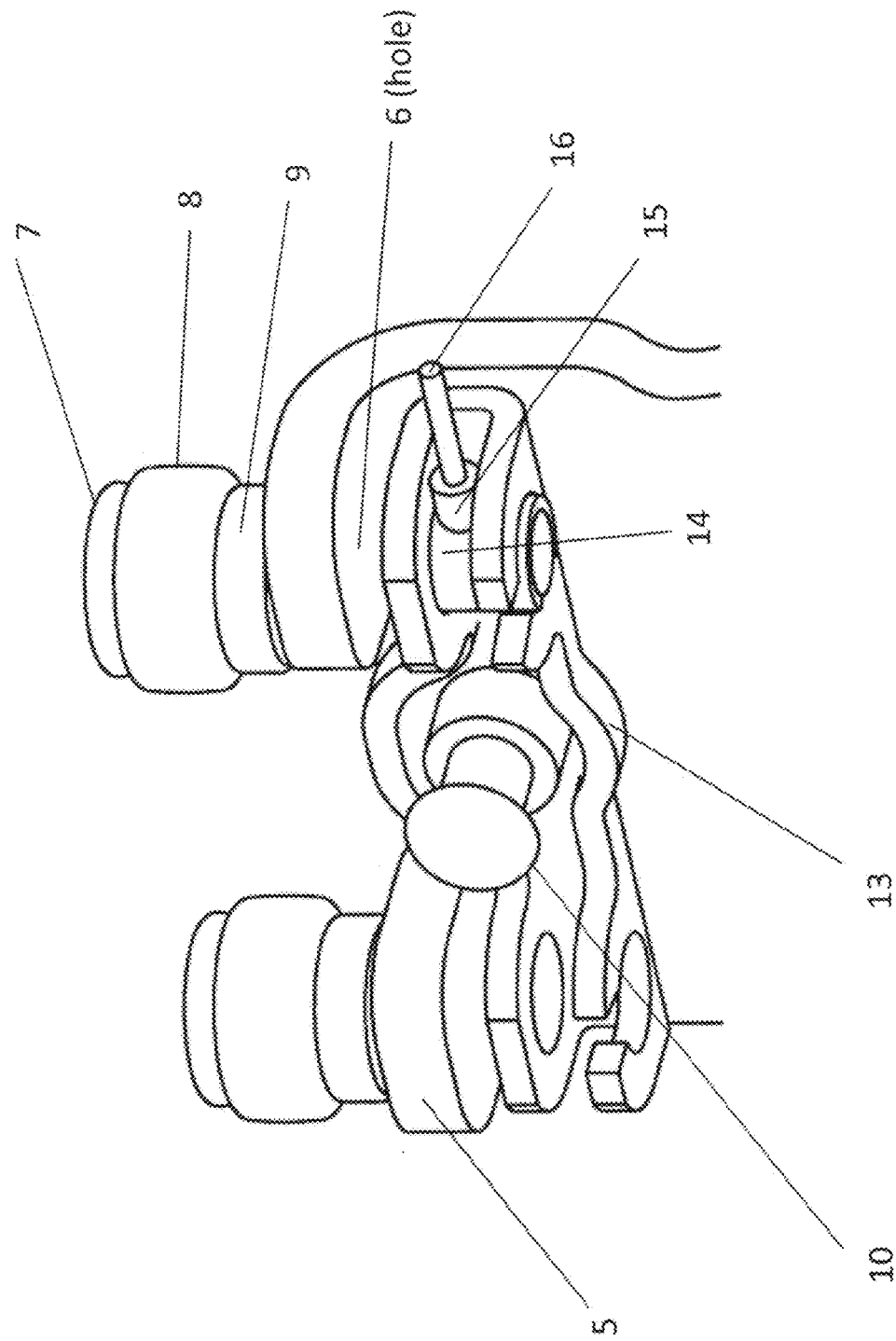
FIG. 2 illustrates an isometric view of slide structure in accordance with the present disclosure.

FIGS. 1 and 2 display isometric views of a slide structure 1 according to a first embodiment of the present application. The slide structure 1 includes a roller hinge 2 and a roller assembly 3. FIG. 1 also illustrates in dashed lines a center rail 100 in which the roller assembly 3 rolls. Here, the center rail 100 has a generally C-shaped cross section but other shapes may be used. Interior surfaces of the center rail 100 interact with the rollers (described in detail later) of the roller hinge 2 to allow the slide door to move along the length of the vehicle.

The roller hinge 2 includes a first end including a pair of through holes 4 into which a pin is inserted. This pin connects the roller hinge 2 to an interior portion of the slide door (not illustrated). The slide door being able to partially rotate around the pin, which facilitates the door opening and closing.

The other end of roller hinge includes two hinge flanges 5. These flanges each include a through hole 6 in a central portion thereof A guide roller pin 7 extends through the through hole 6. The guide roller pin 7 has a substantially constant cross section whose diameter is slightly smaller than the diameter of the through hole 6. That is, the guide roller pin 7 is able to be inserted in the through hole 6 with a predetermined clearance. The top and the bottom of the guide roller pin 7 are clinched as shown in FIG. 2. However, the guide roller pin 7 could be provided with a flat end at either the top or bottom ends. Further, the bottom of the hinge flange 5 could be provided with a counter bore into which a flat bottom end of the guide roller pin 7 could be inserted.

Figure 3:
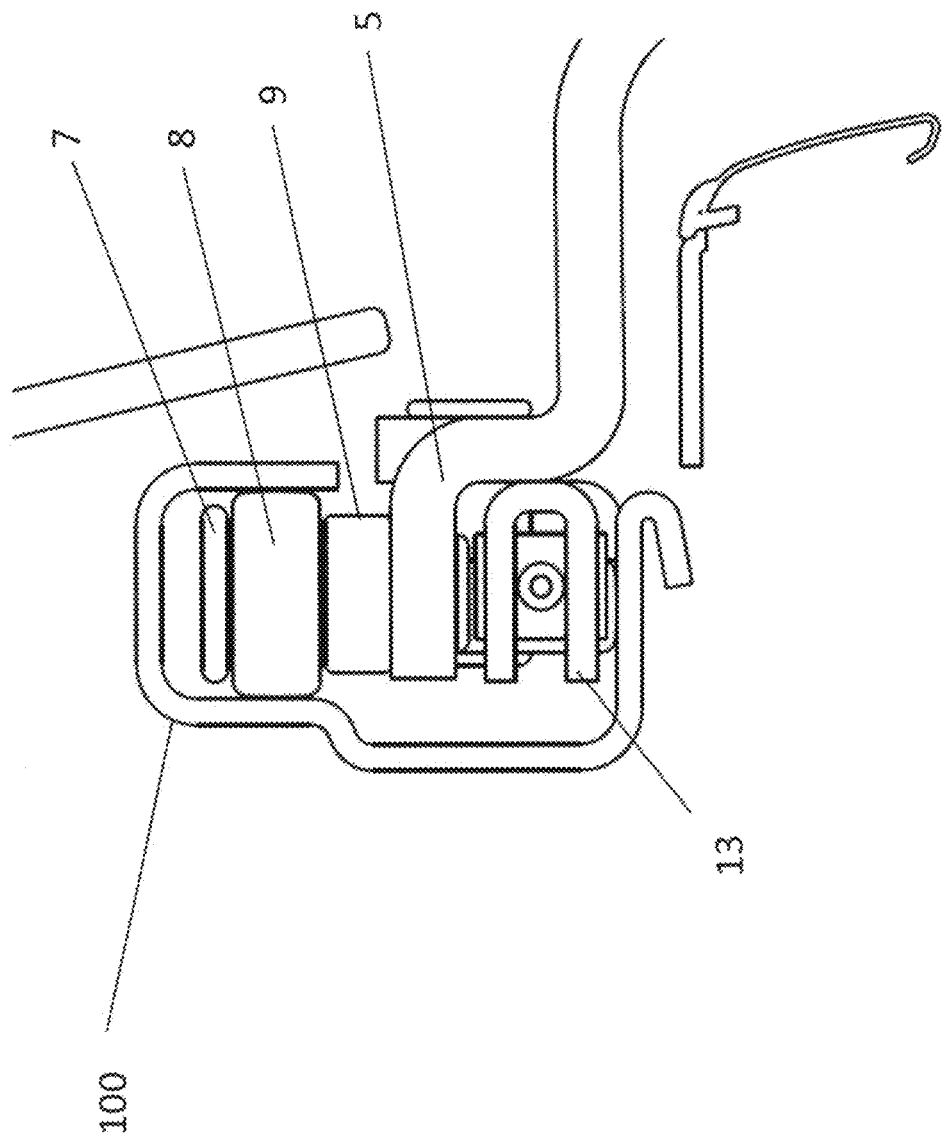
FIG. 3 illustrates a side view of a slide structure in accordance with the present disclosure.

The guide roller pin 7 axially supports a collar 9 and a guide roller 8. As shown in FIG. 2, the collar 9 sits on a surface of the hinge flange 5 with the guide roller pin 7 extending therethrough. The guide roller 8 sits on top of the collar 9 with the guide roller pin 7 extending through a center thereof When assembled as shown in FIG. 2, the guide roller 8 and collar 9 are captured between the top clinch of the guide roller pin 7 and the top surface of the hinge flange 5. The guide roller 8 includes an outer radial surface that is free to rotate relative to the collar 9 and guide roller pin 7. FIG. 3 illustrates that this radial outer surface of the guide roller 8 rolls along a first channel formed in the center rail 100.

Shown in FIG. 2, the roller assembly 3 also includes a main roller pin 10 which extends from a flat portion of the roller hinge 2 below the hinge flange 5. The main roller pin 10 is clinched to the back of the roller hinge 2 as shown in FIG. 3, but other means of retention may be used. A collar 12 and a main roller 11 are arranged on the main roller pin 10, with the main roller pin 10 extending through the collar 12 and main roller 11, respectively. The collar 12 and main roller 11 are retained by the top of the main roller pin 10 by clinching. However, either end of the main roller pin 10 could be provided with a flat portion instead of clinching.

The main roller 11 is able to rotate relative to the main roller pin 10. The main roller 11 rolling in a second channel of the center rail 100 as shown in FIG. 3. The combination of the guide rollers 8 and the main roller 11 allow the roller hinge 2, which is attached to the slide door, to move the slide door A bracket 13 is arranged between the collar 12 and the roller hinge 2. The bracket 13 has a generally C-shaped cross section as shown in FIG. 3. FIG. 2 illustrates a front view of the bracket 13. The bracket 13 has a center section which accommodates the collar 12. The bracket 13 also includes two end sections which are each separated into a top and bottom portion as shown in FIG. 2. The end sections are arranged so that the main roller 11 fit between the end sections and rotates freely when installed. The end sections are substantially identical and are mirror images of each other.

The top and bottom portions of an end section each include a through hole. The hole of the bottom portion being partially opened; this opening forming a keyway. Cable end 14 has a generally cylindrical shape and is inserted in the through holes of the end portions of the bracket 13. An outer diameter of cable end 14 being slightly smaller than the through holes so that the cable end 14 fits tightly with a predetermined clearance.

A cable 16 is secured to the cable end. The cable end 14 is secured to the bracket 13 via the through holes and/or the keyway. The bracket 13 is secured to the roller hinge 2 via the main roller pin 10 or other fasteners. Therefore the cable 16 is secured to the hinge 2 via the bracket 13 and the cable end 14. The other end of the cable 16 is secured to an electric motor (not illustrated) or the like. The electric motor is configured to pull and push the cable 16 in order to open and close the slide door. That is, actuation of the electric motor applies a force to the cable 16 which is transferred to the slide door via the roller hinge 2 and the roller assembly 3. When the electric motor transmits the force, the roller assembly 3 rolls along the center rail 100 via the main roller 10 and the guide rollers 8.

As shown in FIGS. 1-3 the slide assembly 3 of the first embodiment includes a bracket 13 which holds the cable end 14 which secures the cable 16. In the first embodiment, the bracket 13 provides the function of transferring the force from the cable 16 to the roller hinge 2 in order to open or close the slide door.

Figure 4:
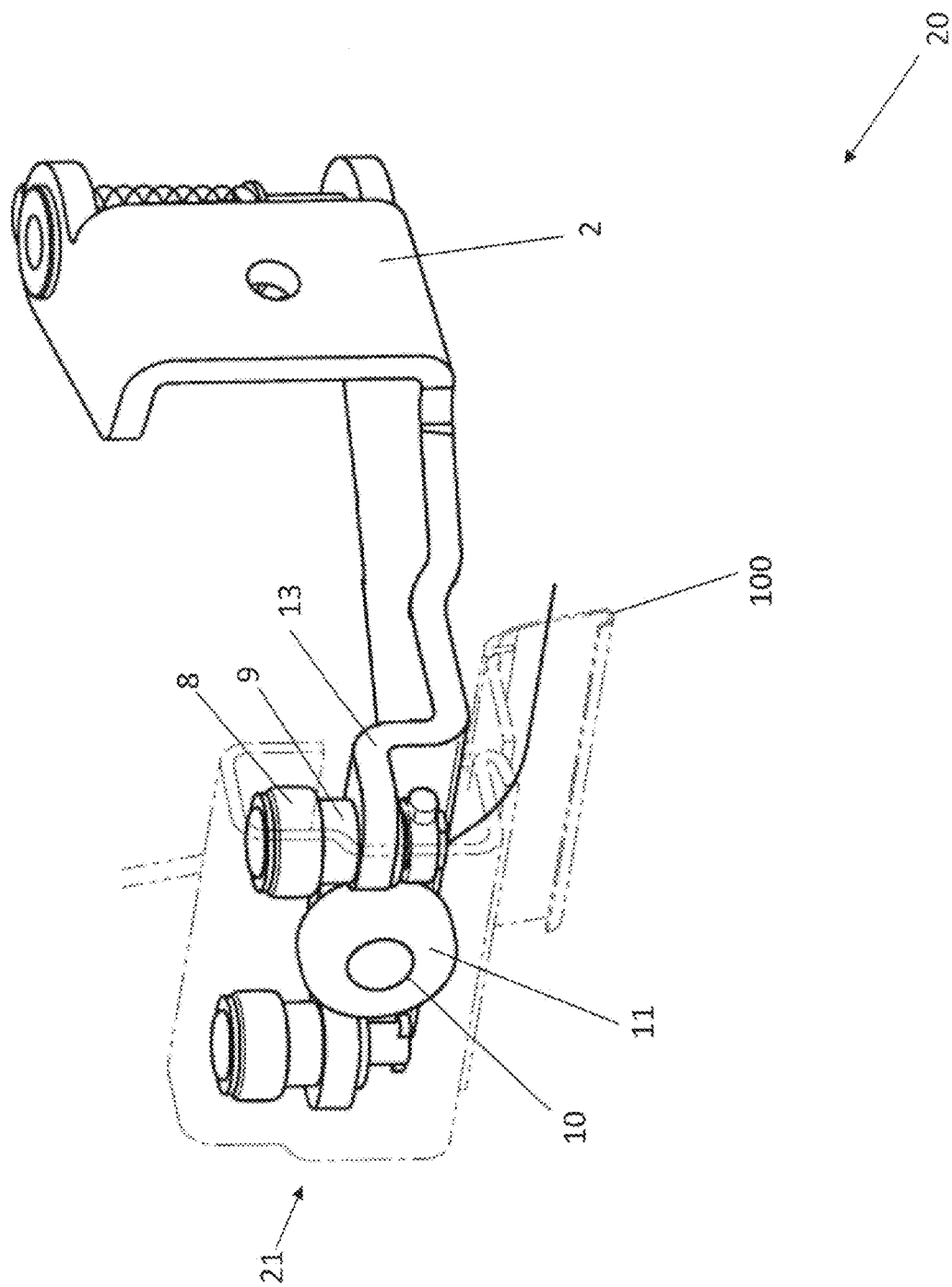
FIG. 4 illustrates an isometric view of a slide structure in accordance with the present disclosure.

FIGS. 4 and 5 illustrate an isometric view of a slide structure 20 according to a second embodiment of the present application. Here like numbers are used for aspects of the second embodiment that are shared with the first embodiment.

The slide structure 20 of FIG. 4 includes a roller hinge 2 and a roller assembly 21. The roller assembly 21 includes a main roller 11, provided on main roller pin 10, and guide rollers 8 which are used to roll within the center rail 100, shown in FIG. 5. Further, guide rollers 8 and collars 9 are also provided on the hinge flanges 5 of the roller hinge 2.

However, the roller assembly 21 lacks the bracket 13 which is provided to roller assembly 3. Instead, which is shown in detail in FIGS. 6-13, the roller assembly 21 includes a guide roller pin 22 onto which the cable end 23 is attached. Further, FIGS. 6-13 serve as illustration for a method of assembling the roller assembly 21.

Figure 6:
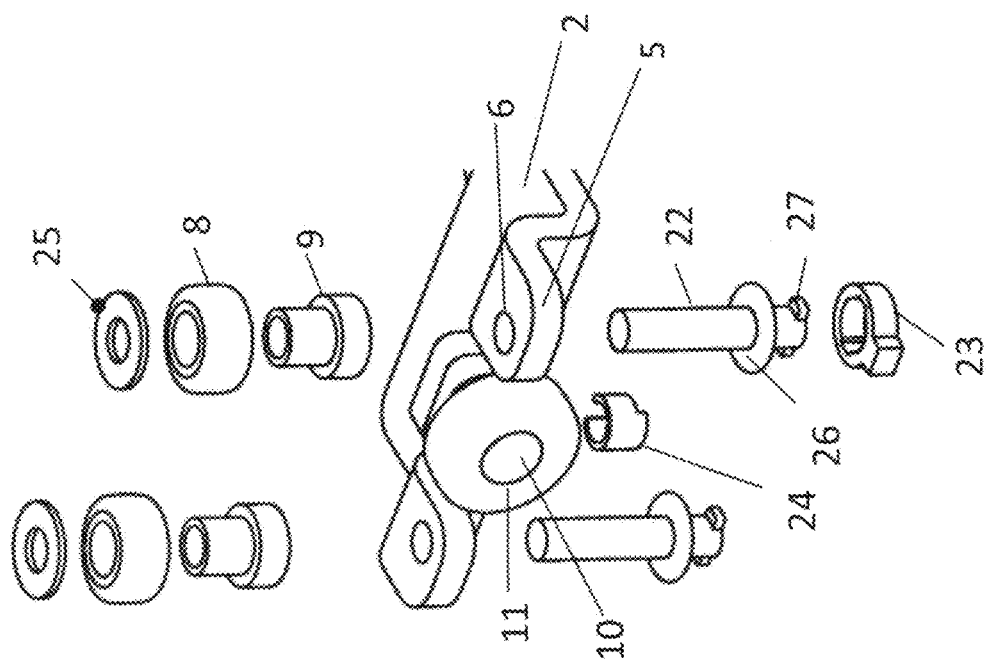
FIG. 6 illustrates an isometric view of a slide structure in accordance with the present disclosure.

FIG. 6 illustrates the roller assembly 21 including a main roller 11 attached to the roller hinge 2 by main roller pin 10. Further, the roller assembly 21 illustrates an unassembled view of a washer 25, guide roller 8, collar 9, guide roller pin 22, cable end 23, and cable end bush 24.

The guide roller 8 and collar 9 are substantially the same as in the roller assembly 3. The washer 25 is a flat washer which has an outer diameter less than the guide roller 8 and an inner diameter greater than the guide roller pin 22.

The guide roller pin 22 has a cylindrical main portion that extends from one end to the other end. The guider roller pin 22 also includes a flange 26 which circumferentially extends from the main portion. The flange 26 has a substantially constant outer diameter that is greater than that of the main portion. Further, the outer diameter of the flange 26 is greater than the outer diameter of the circular portion of the cable end 23. The flange 26 is formed on a lower portion of the guide roller pin 22.

The guide roller pin 22 also includes a key flange 27. The key flange 27 is illustrated in FIG. 6 to include two protrusions but the key flange 27 is not limited to two protrusions. The protrusions extend radially from the main portion of the guide roller pin 22 at opposite sides. That is, the protrusions extend in opposite directions along a common axis.

Figure 7:
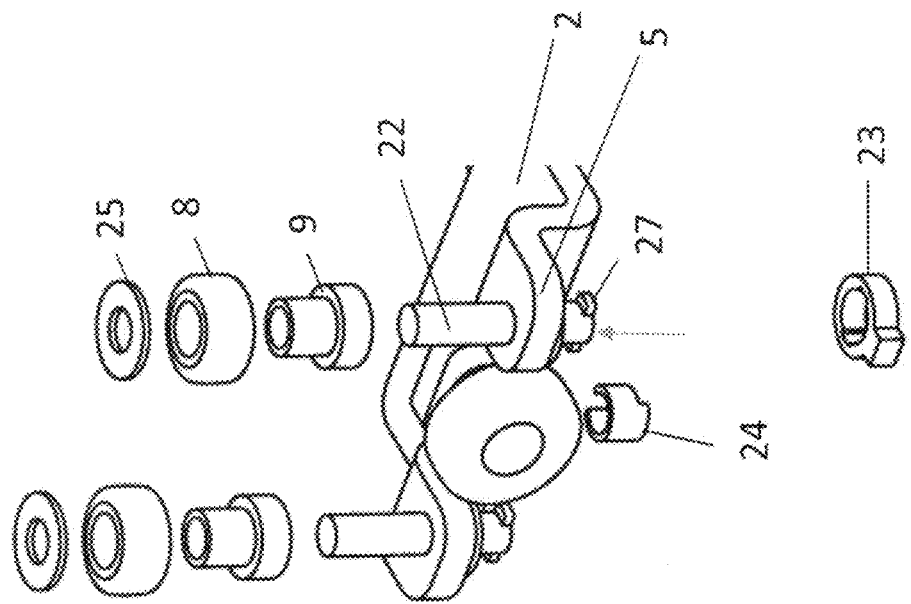
FIG. 7 illustrates an isometric view of a slide structure in accordance with the present disclosure.

FIG. 7 illustrates the insertion of the guide roller pin 22 into the hole 6 of hinge flange 5 of the roller hinge 2. The flange 26 contacts a bottom surface of the hinge flange 5 and restrains further movement of the guide roller pin 22 upwards as shown in FIG. 7.

Figure 8:
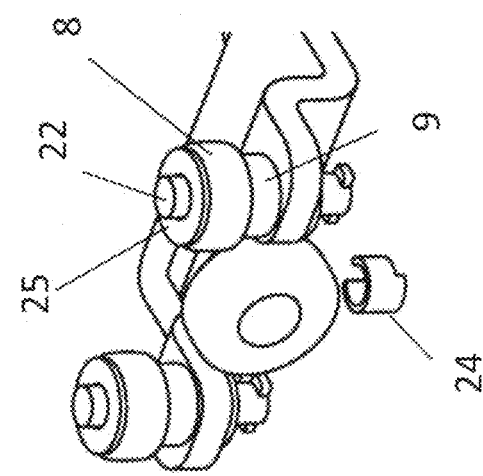
FIG. 8 illustrates an isometric view of a slide structure in accordance with the present disclosure.

FIG. 8 illustrates that the collar 9 is inserted onto the guide roller pin 22 so that the collar 9 contacts a top surface of the hinge flange 5. The guide roller 8 is then inserted on the collar 9, so that, the guide roller 8 contacts a top surface of a large diameter portion of the collar 9 and a small diameter portion of the collar 9 is inserted in the through hole of the guide roller 8. The washer 25 is then inserted on the guide roller pin 22 so that the washer 25 contracts a top of the guide roller 8 and/or the small diameter portion of the collar 9.

Figure 9:
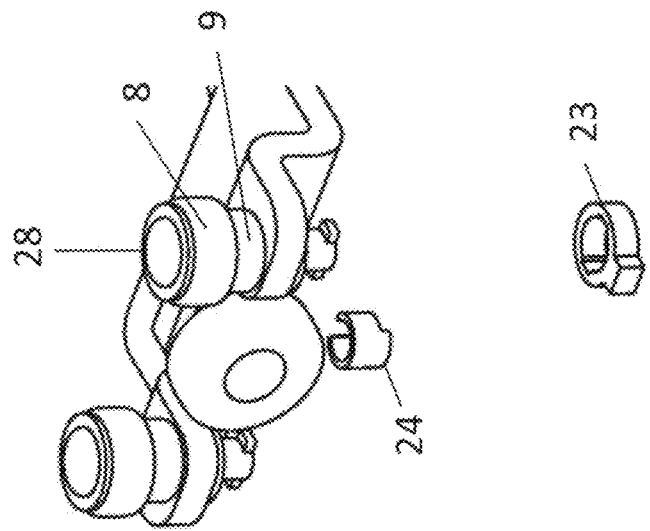
FIG. 9 illustrates an isometric view of a slide structure in accordance with the present disclosure.

FIG. 9 illustrates that the guide roller pin 22 is clinched at the end that penetrates the washer. After clinching, the guide roller pin 22 includes a clinch 28 at the end opposite to the key flange 27. Accordingly, the guide roller 8 and collar 9 are securely held to the hinge flange 5 by the flange 26 and the clinch 28 of the guide roller pin 22. This assures the guide roller 8 is capable of moving within the channel of center rail 100.

FIG. 9 also illustrates cable end bush 23 prior to installation. The cable end bush 24 has a generally C-shaped cross section. The inner surface of the cable end bush 24 is configured to contact the outer surface of the guide roller pin 22 at a lower portion thereof The cable end bush 24 also has notch portions that correspond to the key flange 27. These notch portions provide a step shape to prevent the drop off and rotation of the cable end bush 24 when installed on the guide roller pin 22. When the cable end bush 24 is installed on the guide roller pin 22, the key flange 27 protrudes through the notch portions of the cable end bush 24.

Figure 10:
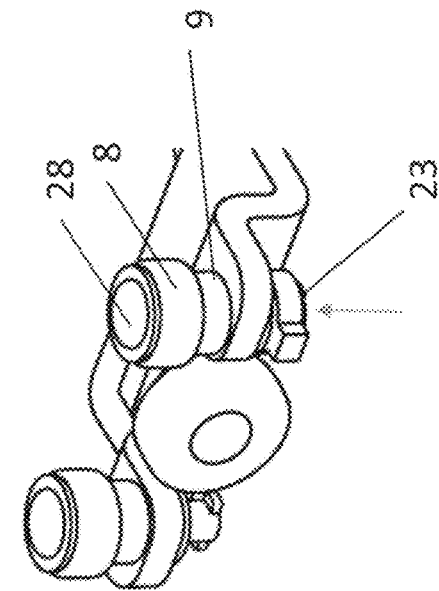
FIG. 10 illustrates an isometric view of a slide structure in accordance with the present disclosure.

FIG. 10 illustrates the cable end bush 24 installed on guide roller pin 24. Due to the key flange 27 and the notch portions, a gap formed in C-shaped cable end bush 24 is towards the roller hinge 2 and away from the cable pull direction. Installed, the cable end bush 24 prevents excessive noise from the cable end 23. Also, the key flange 27 assists in hooking the cable end bush 24 and preventing cable drop off.

FIG. 10 also illustrates the cable end 23 prior to installation. The cable end 23 has a key 29 that corresponds to the key flange 27. Shown in FIG. 10, the key 29 includes two slots on either side of the inner diameter of the cable end 23.

Figure 11:
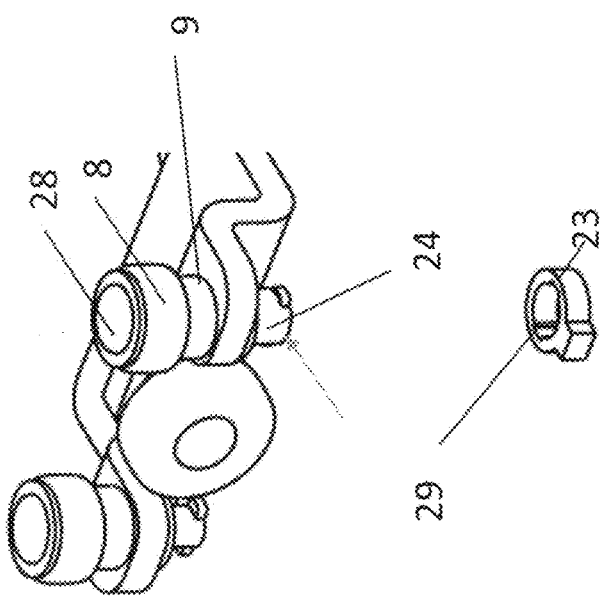
FIG. 11 illustrates an isometric view of a slide structure in accordance with the present disclosure.

FIG. 11 illustrates the cable end 23 installed on the guide roller pin 22. To install, the key 29 of the cable end 23 is aligned with the key flange 27 so that the cable end 23 can fit over the key flange 27. The cable end 23 is then able to contact the bottom of the flange 26.

Figure 13:
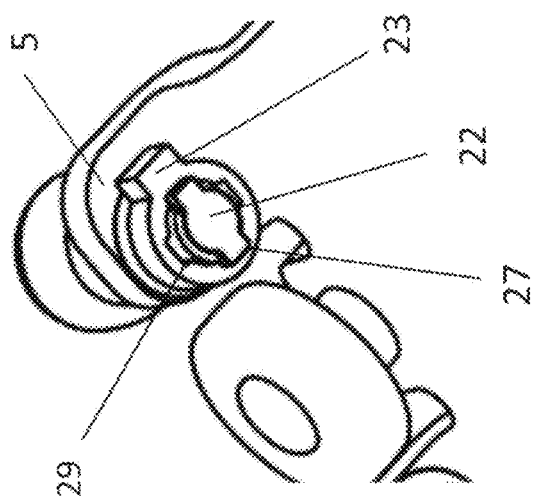
FIG. 13 illustrates an isometric view of a slide structure in accordance with the present disclosure.
Figure 12:
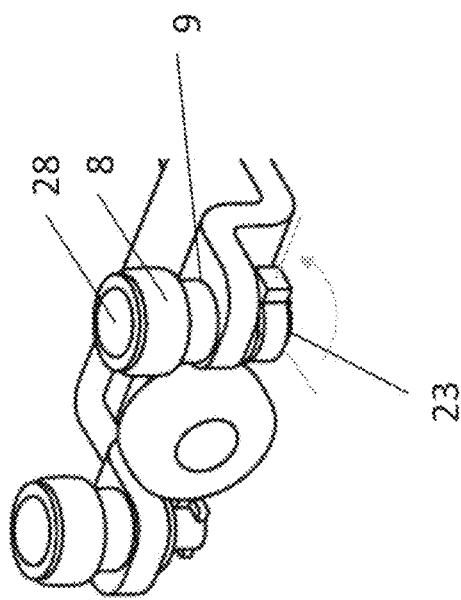
FIG. 12 illustrates an isometric view of a slide structure in accordance with the present disclosure.

In FIG. 12, the cable end 23 is rotated so that that the protruding portion which receives the cable (not illustrated) is aligned in the cable pull direction. The rotation is possible due to the cable end 23 being above the key flange 27. FIG. 13 illustrates an alternate view of the installed cable end 23. Shown in FIG. 13, the key 29 and the key flange 27 are not aligned and, therefore, the cable end 23 is hooked by the key flange 27 and is securely held in place.

Described above in FIGS. 4-13 the second embodiment of the present application includes a roller assembly 21 which does not include a bracket for holding a cable end of a power slide mechanism. The second embodiment instead attaches the cable end 23 via the guide roller pin 22.

Therefore, in the second embodiment, the cable is secured to the hinge 2 via the guide roller pin 22 and the cable end 23. Similar to the first embodiment, the other end of the cable is secured to an electric motor or the like, the electric motor being configured to pull and push the cable in order to open and close the slide door. However, the roller assembly 21 has an advantage of a reduced packaging size due to the bracket being eliminated, compared to the first embodiment.

Although not illustrated, the roller assemblies of the first and second embodiments can also be used for a manual sliding door. When used in a manual slide door there is no requirement for a cable driven by an electric motor or the like. Therefore, in the bracket 13 can be removed from the roller assembly 3, when used with a manual slide door. However, if the roller assembly 3 is used with a manual slide door, the main roller pin 10 would also need to be modified. Described above, the main roller pin 10 attaches the bracket 13 to the roller hinge 2. However, if the bracket 13 is removed, then the main roller pin 10 must be replaced with a different roller main roller pin which accounts for the gap caused by the removal of the bracket 13.

When the roller assembly 21 is used in a manual slide door. The cable end 23 and cable bush 24 may be omitted. However, the rest of the roller assembly 21 is unchanged.

Obviously, numerous modifications and variations of the present invention are possible in light of the above teachings. It is therefore to be understood that within the scope of the appended claims, the invention may be practiced otherwise than as specifically described herein.

The invention claimed is:

1. A slide structure that slides a door of a vehicle, comprising:
    a roller hinge attached to the door;
    a guide roller that rolls within a rail of the door;
    a cable end that transmits a sliding force to the roller hinge to slide the door;
    a guide roller pin that attaches the guide roller and the cable end to the roller hinge; and
    a cable end bush between the guide roller pin and the cable end, wherein
    the guide roller pin includes a key flange that extends radially from the guide roller pin,
    the cable end bush includes a notch portion that corresponds to the key flange and the key flange protrudes through the notch portion, and
    the cable end includes a key that when aligned with the key flange allows the cable end to pass the key flange so that the guide roller pin extends through the cable end.

2. The slide structure according to claim 1, wherein the roller hinge includes at least one hinge flange with a through-hole and the guide roller pin extends through the through-hole.

3. The slide structure according to claim 1, wherein the guide roller pin includes a flange that extends circumferentially from the guide roller pin.

4. The slide structure according to claim 3, wherein the cable end is secured to the guide roller pin when the guide roller pin extends through the cable end, the cable end contacts the flange, and the key and the key flange are not aligned.

5. The slide structure according to claim 1, wherein the cable end is secured to the guide roller pin when the guide roller pin extends through the cable end and the key and the key flange are not aligned.

6. The slide structure according to claim 1, wherein the cable end includes a protruding portion that receives a cable, and the cable end is secured to the guide roller pin when the guide roller pin extends through the cable end and the protruding portion is aligned in a cable pull direction.

7. The slide structure according to claim 1, wherein an inner surface of the cable end bush is configured to contact an outer surface of the guide roller pin and an outer surface of the cable end bush is configured to contact an inner surface of the cable end.

8. The slide structure according to claim 1, wherein the cable end bush has a C-shaped cross-section and the notch portion has a step shape.

* * * * *